United States Patent [19]

Bleeke

[11] Patent Number: 4,529,933
[45] Date of Patent: Jul. 16, 1985

[54] SPEED SENSOR AND METHOD FOR PRODUCING SAME

[75] Inventor: William F. Bleeke, Vandalia, Mich.
[73] Assignee: CTS Corporation, Elkhart, Ind.
[21] Appl. No.: 371,519
[22] Filed: Apr. 26, 1982
[51] Int. Cl.³ .............................................. G01P 3/48
[52] U.S. Cl. ................................. 324/173; 310/168; 310/194
[58] Field of Search .............. 310/168, 169, 170, 171, 310/155, 75 R, 75 C, 194, 266; 324/167, 173, 174

[56] References Cited

U.S. PATENT DOCUMENTS

| | | | |
|---|---|---|---|
| 3,458,741 | 7/1969 | Woodward | 310/155 |
| 3,500,091 | 3/1970 | Jones | 324/174 |
| 3,504,208 | 3/1970 | Rivers | 324/174 |
| 3,551,712 | 12/1970 | Jones | 310/168 |
| 3,736,449 | 5/1973 | Honeywell | 310/171 |

Primary Examiner—R. Skudy
Attorney, Agent, or Firm—Rodger H. Flagg

[57] ABSTRACT

A rotational speed sensor (10) comprising a shaft (54) having a reluctor (50) mounted thereon and coacting with a complementary shaped stator (18). The reluctor (50) and stator (18) have coacting regularly spaced projections (20, 58) which are magnetizable so that as the reluctor (50) rotates with the shaft (54), there is developed a cumulative voltage output which in turn enables utilization of much greater air gaps between the respective projections (20, 58). Because of the greater latitude in the air gaps, it is possible to construct a variable reluctance speed sensor (10) much more economically and with less emphasis on cumulative manufacturing tolerances. This greater flexibility of manufacturing with higher manufacturing tolerances contributes materially to the attainment of an economical and reliable speed sensor.

4 Claims, 6 Drawing Figures

SPEED SENSOR AND METHOD FOR PRODUCING SAME

TECHNICAL FIELD

This invention relates to a speed sensor employing a permanent magnet, a bobbin and winding, a stator, and a relatively rotatable reluctor secured to a drive shaft. The generated voltage output is directly related to the rotational speed of the drive shaft, to provide a rotational speed value.

BACKGROUND ART

This invention relates to an apparatus for sensing rotational speed and a method for monitoring rotational speed. It is established art to use a combination stator and relatively rotatable reluctor, each having coacting portions, so related that they will effect a predetermined change in reluctance when one portion rotates or moves past a cooperating part of the other. Generally speaking, the functional portions of a relatively rotatable reluctor and stator can be in the form of protuberances or points which cause a change in flux density as they move one past the other, and effected by this change in flux density is the generation of a voltage output because the two parts, one moving past the other, serve as a generator that develops a voltage output. This voltage output occurs as an alternating voltage output and the frequency of the alternating voltage is a direct measure of rotational speed of either a drive shaft or other member rotating the reluctor. The amplitude and frequency of the voltage are the significant parameters utilized in calculating the rotational speed of the reluctor. However, these expedients do not relate or address the problem of how to obtain a speed sensor which can accommodate for relative movement, particularly in a radial direction, between the reluctor and the stator without disturbing the value of the voltage output at various positions of the reluctor relative to the stator. Heretofore the conventional constructions demanded manufacturing tolerances which would not permit a high a degree of relative axial an radial movements between the reluctor and the stator without introducing a false signal for adversely affecting the voltage output. Also, in previous devices it was necessary to maintain the air gap between the relatively rotatable or movable member and the stationary member within well defined tolerances. To the degree that those tolerances had to be maintained within close limitations, this added materially to the cost of the device, and to the extent that the tolerances were not maintainable, certain factors of error were introduced in the readout because of a change in the amplitude of the voltage output which made it more difficult to monitor consistently.

In the assembly of sensor devices of the type described, what has long been needed is a quick and efficient way of mounting the sensor and obviate the need for such devices as jam nuts, E-rings, threads, and the like. What the present invention comprises is a housing device which has an integrally constructed or an insert molded mounting ring disposed at the open end of the housing and after the sensor is assembled and mounted within a coacting housing the combination is simply press fitted through the mounting ring within a companion opening of a complementary housing. Overall, it is intended in the present invention to provide a rotational speed sensor and method for monitoring rotational speed wherein the air gaps which are an essential feature of any magnetic speed sensor, are much larger because the combination of reluctor and stator develops a greater voltage amplitude and is less affected by air gaps magnitude and variations. Because of this greater degree of voltage amplitude output, it is possible to tolerate greater air gaps and greater variation of air gaps without compromising or preventing a readily readable voltage output. All of this contributes to the manufacturing and assembly of a highly reliable rotational speed sensor; one which is easily assembled, is relatively free from readout error, is inherently more readable itself, and can be easily mounted upon a companion structure such as a vacuum pump or other adjacent structure.

DISCLOSURE OF THE INVENTION

The present invention comprises a magnetically permeable housing having a housing and winding mounted within the bobbin, a permanent magnet disposed at the geometric center of the bobbin and housing, and a cup disposed against one of the faces of the magnet. Surrounding the bobbin, cup, and permanent magnet, is a stator which has a number of regularly spaced projections each separated by a slot. A drive shaft includes a reluctor with a centrally formed cylindrical boss. The boss is received within the cup and at the outer periphery of the reluctor are a number of regularly spaced projections each separated by a slot. The reluctor projections match in number and construction the projections on the stator and are mounted closely adjacent thereto, so that as the drive shaft rotates, the reluctor projections will each move successively past a complementary projection of the stator, into the slot between stator projections, and then successively past the next succeeding stator projection. This operation is repetitive for each of the coacting projections on the reluctor and stator during rotation of the drive shaft, with the result that there is developed an alternating voltage communicated to a pair of conductors attached to the winding on the bobbin. The output voltage is the cumulative voltage output of each reluctor projection moving past an associated stator projection, and thus there is a much higher amplitude of the voltage output. As a result of the increased voltage amplitude, it is possible to increase the air gaps between the reluctor and stator projections, and the same applies for the air gaps in the flux path throughout the device.

Because it is possible to obtain acceptable levels of voltage output with greater air gaps, this translates into a sensor having component parts with greater tolerance limitations. It is axiomatic, of course, that with greater manufacturing tolerances, the number of rejected parts and the number of mismatched parts is greatly reduced, and it is possible to insure a higher degree of reliability in voltage output reading notwithstanding changes in air gap configurations. As a result, the present invention achieves much greater economy in contruction and operation, and also is more reliable in use and has a greater service life as the components locating the reluctor experience any wear.

BEST MODE FOR CARRYING OUT THE INVENTION

Figure 1:
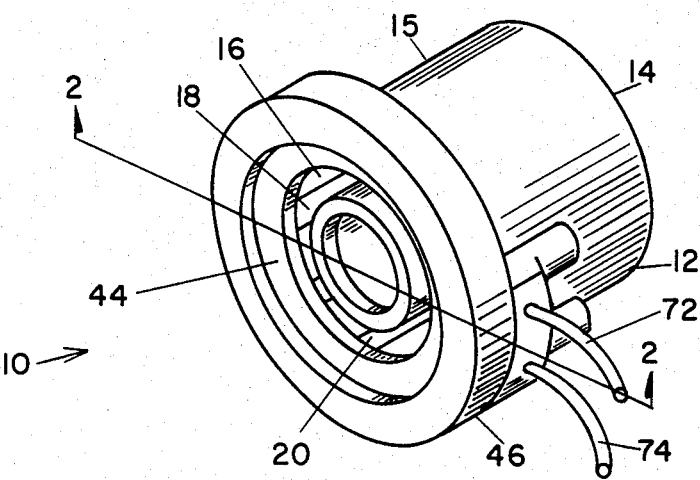
FIG. 1 is an isometric view of the sensor.
Figure 2:
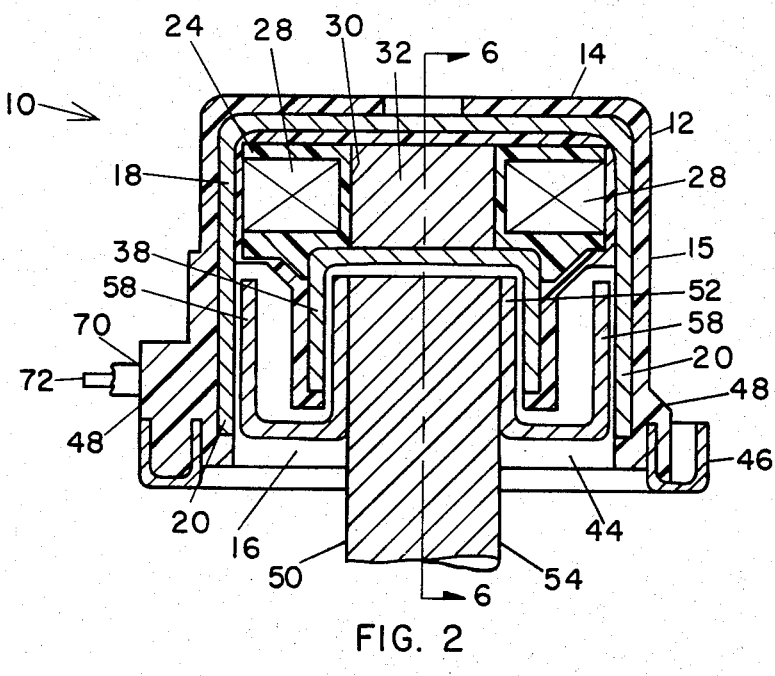
FIG. 2 is a section view taken on line 2—2 of FIG. 1.
Figure 3:
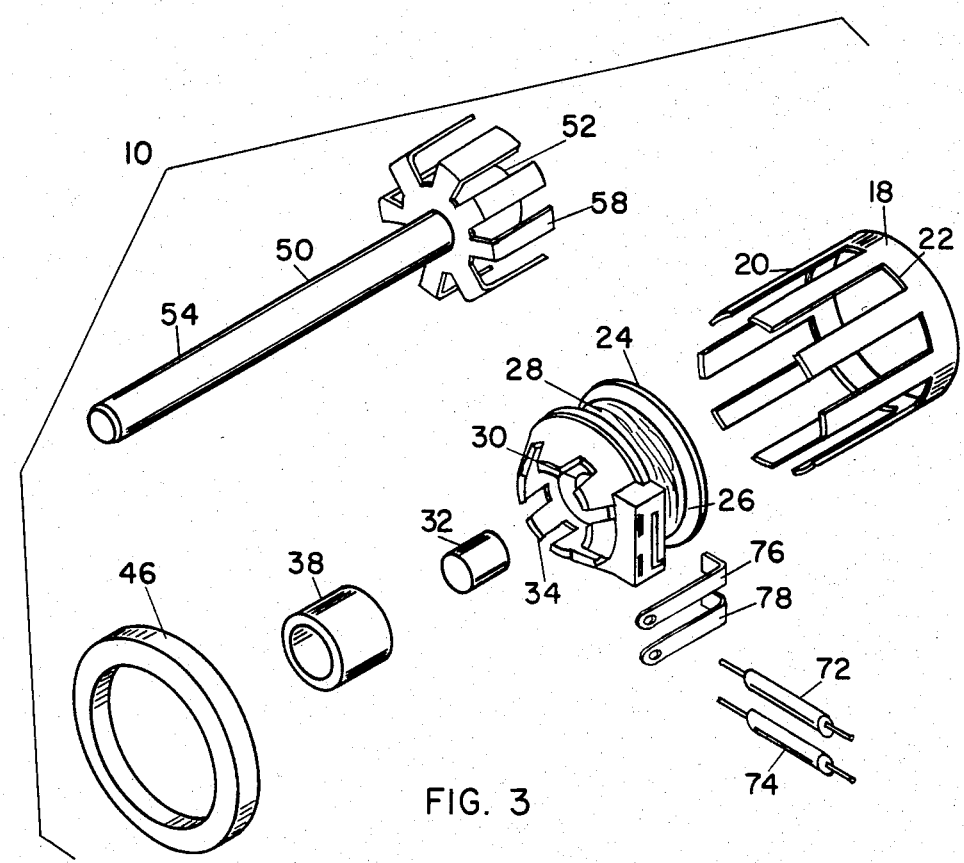
FIG. 3 is an exploded isometric view of the sensor components, not including the molded housing.

Referring now to the drawings, and particularly FIGS. 1-3, there is illustrated a variable reluctance speed sensor designated generally by reference numeral 10. The sensor consists of a housing 12 of nonmagnetizable material, and having a base 14 and a cylindrical side wall 15 defining an interior chamber 16. Fitted within the chamber 16 is a stator 18 having regularly spaced projections 20, extending from housing base 14 axially along housing 12 with each adjacent projection being separated by a slot 22. Although the number of projections can vary according to design preference, a total of eight such projections forms a preferred design. Also received within the chamber 16 is a bobbin 24 receiving windings 28 within a groove 26 of a winding-and-bobbin assembly. At the geometric center of the bobbin is an opening 30 wherein is received a permanent magnet 32. Abutments 34 of the bobbin 24 are adapted for mounting a cup 38 of magnetizable material such as cold rolled steel disposed adjacent to magnet 32 and opening towards the housing opening.

The open end 44 of the housing 12 has a metallic ring 46 insert molded about the periphery 48 of the housing 12.

Drive shaft 54 includes a centrally disposed boss 52 of a reluctor 50 secured thereto. At the outer circumference of the reluctor 50 are a series of regularly spaced projections 58 which correspond to the number of projections 20 on the stator 18, and are arcuately spaced about the circumference of the drive shaft 54 so that they are complementary with the stator projection 20 and also corresponding in shape and dimension.

Openings 70 in the housing 12 provide for two conductors 72 and 74 electrically connected to the windings 28 through terminals 76 and 78 (See FIGS. 2 and 3).

It is an important feature of the present invention that the shaft 54 and reluctor projections 58 have a substantial latitude for axial and radial movements along the axis of the shaft. Moreover, it can be seen from FIGS. 2 and 6 and in particular FIG. 6, that there are substantial air gaps labeled "PRIMARY AIR GAP" and "SECONDARY AIR GAP". The combination of this greater latitude for axial movement and increased air gaps, permits assembly with less regard for manufacturing stack-up tolerances. Also, the sensor can be assembled with fewer rejects and has a longer operational life because the larger air gaps insure reduced incidence of shorting and other such occurrences which tend to reduce the useful life of the product.

Figure 4:
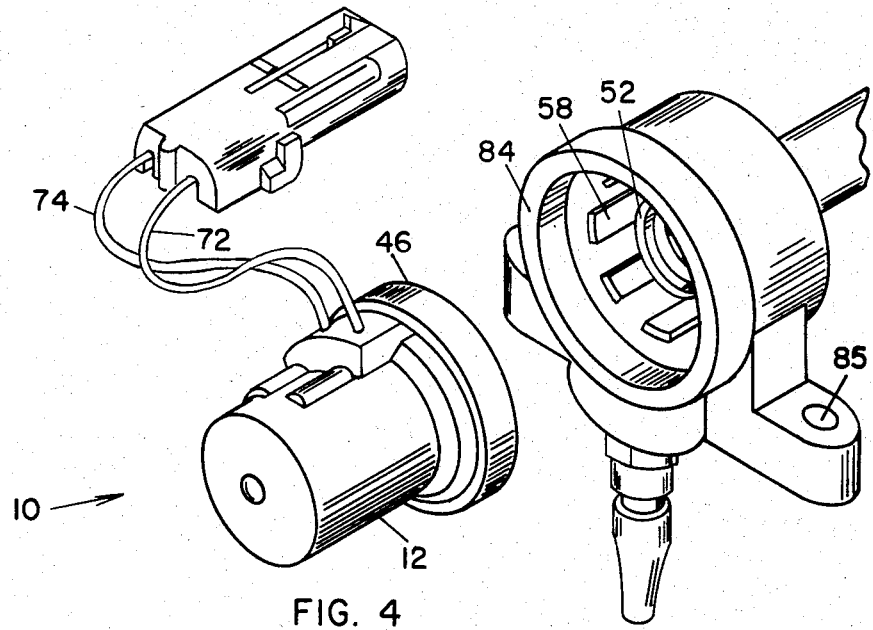
FIG. 4 is an isometric view of the sensor positioned for mounting on a vacuum pump housing.

In the process of assembly, the housing 12 having a housing opening and is formed about the stator 18, bobbin 24 and windings, 28, conductors 72, 74 and terminals 76, 78, permanent magnet 32 together with the cup 38, and mounting ring 46, all of these parts being insert molded to form a unitary structure. The mounting ring 46, insert molded and thus permanently joined to the open end 44 of the housing 12, enables press fitting into a companion housing or jacket 84 (see FIG. 4), the fitting being further sealed in any suitable manner by a penetrating sealant or the like.

The drive shaft 54 and reluctor 50 are located within the open end of the housing 84 so that when the sensor 10 is fitted to the housing 84, the boss 52 is disposed within the cup 38 without touching any of the surfaces thereof. The housing 84 allows the sensor 10 to be "dropped" in place over the projections 58 of the reluctor 50 and the assembly press fitted into the housing 84 with the ring 46 having an interference fit with the open end of the housing 84. When the sensor 10 is joined to the jacket 84, there is established readily and easily the operative position of the reluctor projections 58 relative to the stator projections 20 because of the ability of the device to accommodate for substantial variations in air gaps and at the same time provide for any axial movement of the drive shaft 54 and attached reluctor 50. Additionally, because the boss 52 and reluctor projections 58 may be mounted on an engine shaft such as shaft 54, the sensor 10 does not require the bearings, couplings, and separate shafts typical of prior art generators.

Rotation of the drive shaft 54 causes the reluctor projections 58 to move past the complementary stator projections 20, thereby changing the magnetic force field and the magnetic circuit. When the reluctor projections 58 are in alignment with the corresponding stator projections 20, the magnetic path will be enhanced, as illustrated in FIG. 6. The magnetic field progresses from the magnet 32 to the cup 38, across the secondary air gap, through the boss 52 of the reluctor 50, the reluctor projection 58 and across the primary air gap, through the stator projection 20 and then returning through stator 18 to the magnet 32 to complete the magnetic circuit. When the reluctor projections 58 move past the corresponding stator projections 20 and into slots 22 separating adjacent stator projections, the magnetic flux will be diminished because there is greater reluctance. This change or cutting of magnetic flux lines generates as alternating voltage because the device operates as a generator. Typically, this alternating voltage can be illustrated in the manner shown schematically in FIG. 5. The voltage frequency is directly related to the rotational speed of the shaft, and may therefore be utilized to calculate the speed of rotation of the shaft 54.

One of the important advantages of the present invention is that the amplitude of the output voltage is increased because of the plurality of reluctor projections 58 and corresponding stator projections 20. Because the device has the characteristic of greatly increasing the amplitude of the voltage output, there is minimized the effect of the greater air gaps both at the primary air gap region and the secondary air gap region. It is characteristic of the present invention that because all of the flux lines are cut simultaneous by each of the reluctor and stator projections, there is achieved this greater amplitude of the output voltage, thus enabling the designer to provide a sensor having larger air gaps and tolerances.

Figure 5:
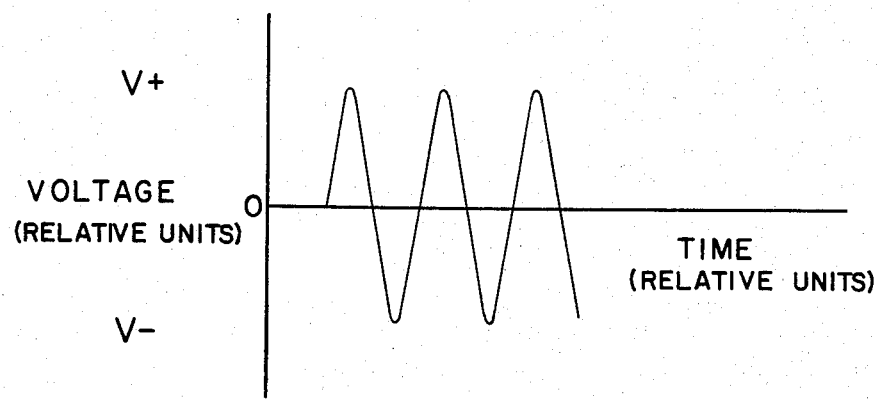
FIG. 5 is a graph of voltage output versus time.
Figure 6:
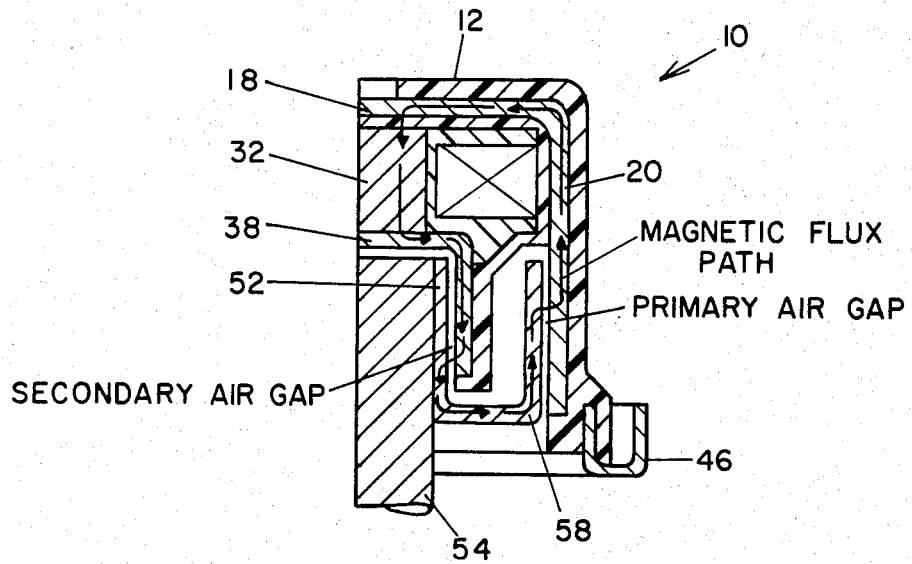
FIG. 6 is an enlarged sectional detailed view taken on line 6—6 of FIG. 2, of the stator, magnet, cup, reluctor, and associated structure, and illustrating the magnetic flux circuit.

As the drive shaft 54 rotates, the rotational movement continues to develop the successive voltage cycles as illustrated in FIG. 5, and this is converted readily to a rotational speed for the shaft 54.

The variable reluctance speed sensor is used typically in automotive applications where it can provide information as to rotational speed which is particularly useful as one of the parameters communicated to a microprocessor which, through a suitable algorithm, determines an output signal adapted for controlling devices such as exhaust gas recirculation (EGR) mechanisms and the like. The sensor is also particularly useful for sensing shaft rotation in diesel engines, this being a particularly valuable control parameter. Heretofore, this parameter, while available, was difficult to obtain in a reliable manner and particularly with a device of the cost magnitude and simplicity of the present sensor.

Industrial Applicability

This device measures accurately and continuously the rotational speed of a drive shaft in such applications as motor vehicles, of internal combustion operation.

Conclusion

Although the present invention has been illustrated and described in connection with an example embodiment, it will be understood that this is illustrative of the invention, and it is by no means restrictive thereof. It is reasonably to be expected that those skilled in the art can make numerous revisions and additions to the invention and it is intended that such revisions and additions will be included within the scope of the following claims as equivalents of the invention.

I claim:

1. A sensor for measuring rotational speed, comprising a nonmagnetic housing having a housing opening; means forming a stator received within said housing and including a base and a plurality of regularly spaced stator projections extending from said base axially along said housing; a winding-and-bobbin positioned within said housing and adjacent said base, a bobbin of said winding-and-bobbin having a bobbin opening; means forming an electrical connection with a winding of said bobbin; a magnet disposed at the geometric center line of said bobbin within said bobbin opening; means forming a cup which is disposed adjacent said magnet and opening toward the housing opening; a rotatable shaft having a boss at the end thereof proportioned to fit within said cup means; and a plurality of circumferentially spaced reluctor projections secured to said shaft, said reluctor projections complementary with said stator projections and positioned for rotation relative to said stator projections, the reluctor projections and stator projections being proportioned to permit at least limited axial and radial movement of said shaft and reluctor projections relative to said stator projections, such that rotation of said shaft brings the reluctor projections successively past the complementary spaced stator projections, into the spaced position between the stator projections, then past the next stator projections to develop a magnetic path comprising the magnet, cup means, air gap between said cup means and said boss, the reluctor projections, the air gaps between said reluctor projections and stator projections, the stator projections, and said stator, and magnetic flux lines are alternately diminished and enhanced between said spaced stator and spaced reluctor projections during shaft rotation to form an alternating voltage therebetween, whereby said alternative voltage having a frequency directly related to the rotational speed of said shaft.

2. The sensor in accordance with claim 1, including mounting ring means disposed at said housing opening for press fitting into a companion housing.

3. The sensor in accordance with claim 1, wherein the magnet comprises an annular magnet.

4. The sensor in accordance with claim 1, wherein said stator projections and reluctor projections are complementarily spaced so that said flux lines are simultaneously cut by each of the reluctor projections and stator projections during shaft rotation to provide a greater amplitude of output voltage.

* * * * *